Jan. 31, 1928.

E. M. LONG 1,657,720

LENS EDGING MACHINE

Filed March 30, 1923   5 Sheets-Sheet 3

INVENTOR
E. M. Long
BY
Howard P. Denison
ATTORNEY

Jan. 31, 1928.

E. M. LONG 1,657,720

LENS EDGING MACHINE

Filed March 30, 1923     5 Sheets-Sheet 4

INVENTOR
E. M. Long
BY
Howard F. Denison
ATTORNEY.

Jan. 31, 1928.

E. M. LONG

LENS EDGING MACHINE

Filed March 30, 1923    5 Sheets—Sheet 5

INVENTOR
E. M. Long
BY
Howard P. Denison
ATTORNEY.

Patented Jan. 31, 1928.

1,657,720

UNITED STATES PATENT OFFICE.

ELI MAYNARD LONG, OF GENEVA, NEW YORK, ASSIGNOR, BY MESNE ASSIGNMENTS, TO THE STANDARD OPTICAL COMPANY, OF GENEVA, NEW YORK, A CORPORATION OF NEW YORK.

LENS-EDGING MACHINE.

Application filed March 30, 1923. Serial No. 628,939.

This invention relates to a lens edging machine and in some respects, is similar to that set forth in my Patents Nos. 1,489,606 and 1,527,594, in that the rotary lens holder is disposed diagonally of the plane of rotation of a rotary grinder to bring the edge of the lens in contact with opposed faces of the grinder for beveling both corners of the edge of the lens at the same time and is free to move axially and radially by contact of different portions of the edge of the lens with the opposed grinding faces.

The lenses to be beveled are usually brought to the machine cut to approximately the size required so that the only work required by the machine is to grind the edge of the lens to the required bevel and finish.

Experience has proven that this finishing operation may be produced by a certain number of revolutions of the lens against the grinder under a predetermined pressure sufficiently light to prevent breaking or chipping of the glass and while I am aware that certain devices have heretofore been proposed for automatically regulating the finishing operation for a definite number of turns of the lens against the grinder, as for example, the device shown in my Patent No. 1,527,594, previously referred to, I have found that such mechanism is somewhat complicated and delicate and not sufficiently sturdy to withstand long contnued use.

The main object, therefore, of my present invention is to provide more simple, durable and reliable mechanism for producing the desired beveled finish during a predetermined number of revolutions of the lens against the grinder and to enable those revolutions to be varied at will according to the quality of the glass or for any other reason, by the use of simple adjustments which can be made at any time during the operation of the machine or while the latter is at rest.

In other words, I have discovered that by mounting the supporting frame for the grinder in certain relation to the lens holder and to other parts of the machine, the said frame with the grinder thereon may be automatically fed toward the lens holder to produce the desired finishing operation with less complicated and more dependable mechanism than has heretofore been practiced and, at the same time bring the adjusting means into more convenient position for manipulation, while the machine is in operation resulting in greatly increased output and accurate sizing and finishing of the lenses.

Other objects and uses relating to specific parts of the machine will be brought out in the following description.

The main supporting frame may be of any suitable construction, but as shown, comprises a base —1— and opposite upright brackets —2— rigidly secured to the rear portion of the base —1— in transversely spaced relation and connected at their upper ends by cross bars —3— and —4— and at their intermediate portions by additional cross bars —3'— and —4'— for stiffening and other purposes hereinafter described.

Grinder mechanism.

Figure 3:
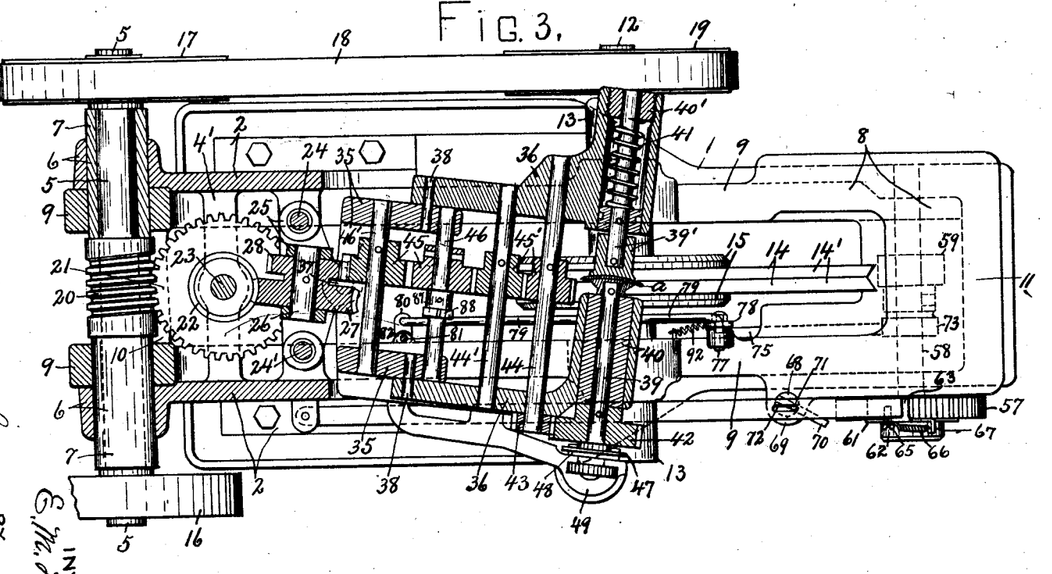
Figure 3 is a horizontal sectional view taken on line 3—3, Figure 2.

A horizontal cross shaft —5—, Figure 3, is journaled in suitable bearings —6— on the rear portions of the brackets —2— in a plane some distance above the base —1— and also some distance below the cross bar —4—, said bearings being provided with sleeves —7— extending inwardly beyond the inner faces of the upright portions of the brackets for receiving and supporting the rear end of a forwardly extending supplemental frame —8— which is provided with rearwardly extending arms —9— journaled upon the inner ends of the sleeves —7— in transversely spaced relation for vertical rocking movement toward and from the base —1— and directly over the central portion thereof, said arms —9— being connected near their rear ends by a cross bar —10— while their front ends are similarly connected by a cross bar —11— directly over the front portion of the base —1—, Figure 4, leaving a clear open space between the intermediate portions of the arms mainly for the reception of a rotary grinding stone presently described, and also to permit the waste grindings and moisture commonly used in grinding to pass into or through the underlying base where it may be drained off or collected for re-use in any desired manner not necessary to herein illustrate or describe.

A horizontal cross shaft —12— is journaled in suitable bearings —13— on the intermediate portions of the arms —9— of the supplemental frame —8— parallel with the shaft —5— for receiving and supporting a rotary grind stone —14—, the latter being clamped by and between opposed collars —15— on the shaft —12— to cause the grind stone to rotate with said shaft.

A pulley —16— is secured to one end of the shaft —5— and is adapted to be connected to any suitable source of power for transmitting rotary motion thereto, the opposite end of said shaft being provided with a tight pulley —17— which is connected by a belt —18— to a pulley —19— on the corresponding end of the grinder shaft —12— for rotating the latter although it is evident that other means for transmitting motion from the shaft —5— to the shaft —12— may be employed and that the ratio of speeds of said shafts may be varied as required.

The grind stone —14— is preferably composed of similar disks of abrasive material secured together face to face preferably with an interposed layer of absorbent material such as blotting paper, and is provided with opposed beveled grinding faces —14'— to form a V-shaped groove for receiving the edge of the lens to be ground.

The supplemental frame —8— extends practically the entire length of the underlying base —1— while the grind stone shaft —12— is located some distance in front of the driving shaft —5— and with the grind stone thereon, is adapted to move bodily in an arc of relatively long radius as the supplemented frame —8— is rocked about the axis of the driving shaft —5— in a manner hereinafter more fully explained.

*Lens supporting and driving mechanism.*

Figure 4:
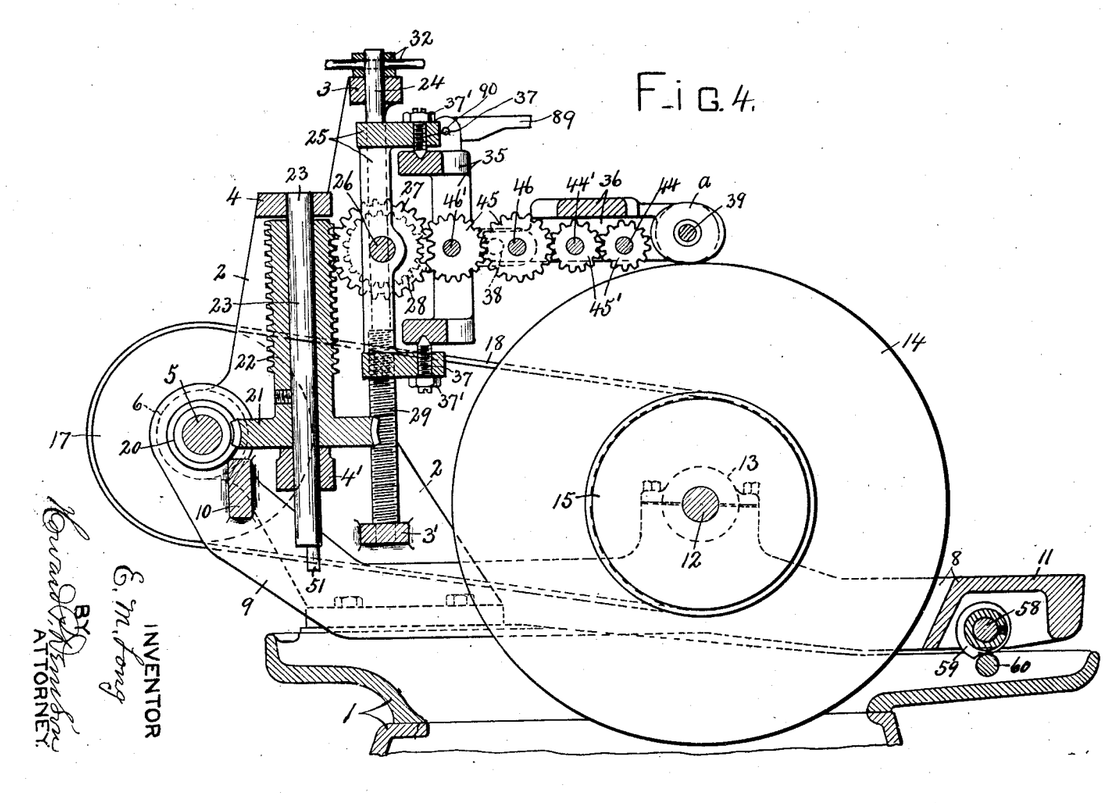
Figure 4 is a longitudinal vertical sectional view taken on line 4—4, Figure 1.

A gear-worm —20— is secured to the driving shaft —5— and meshes with a worm gear —21— which together with a relatively long coaxial gear-worm —22— are secured to the intermediate portion of an upright shaft —23—, Figure 4, the latter being journaled at its upper and lower ends in suitable bearings in the upper and lower cross bars —4— and —4'—.

A pair of upright parallel guide rods —24— and —24'— are mounted in transversely spaced relation in suitable bearings in the upper and lower cross bars —3— and —3'— for supporting and guiding a vertically movable carriage —25— and upon the intermediate portion of this carriage is journaled a relatively short cross shaft —26— to which is secured coaxially, a worm-gear —27— and a spur gear —28— both located between the upright guide rods —24— and —24'—, the worm gear —27— being in mesh with the relatively long worm —22— for receiving rotary motion therefrom and transmitting the same to the shaft —26— and spur gear —28—.

Figure 5:
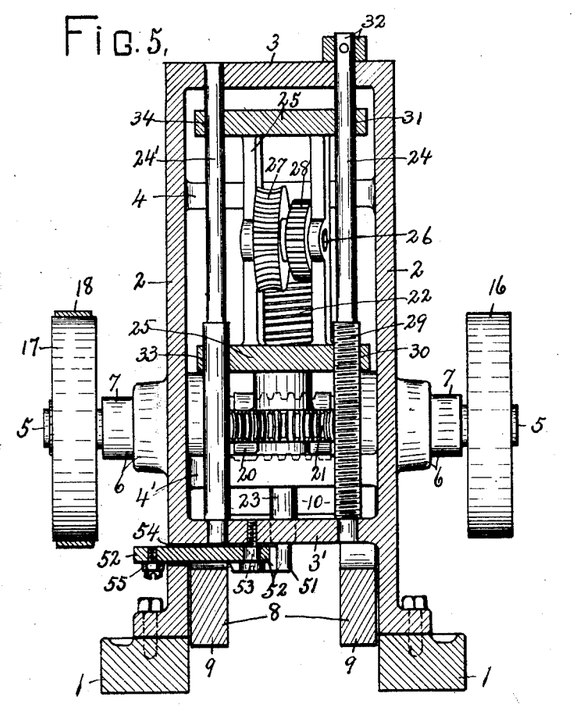
Figure 5 is a transverse vertical sectional view taken on line 5—5, Figure 1.
Figures 6, 7, 8:
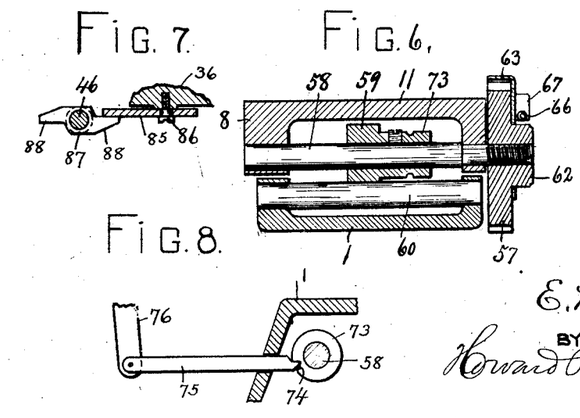
Figure 6 is a transverse sectional view taken on line 6—6, Figure 1.
Figure 7 is a detail sectional view of the lifting cam and pawl for the lens holder frame.
Figure 8 is a detail sectional view of the notched disk and pawl for controlling the lifting pawl of the lens holder frame.

As shown in Figure 5, one of the upright guide rods as —24— has a considerable length of its lower end threaded at —29— and engaged in a threaded aperture —30— in the corresponding side of the lower end of the carriage —25— while the upper portion of the same rod is smooth and cylindrical and is passed through an opening —31— in the corresponding side of the upper end of the carriage to permit that end of the carriage to slide vertically thereon when the carriage is adjusted vertically by the rotation of the screw —29— which also serves to hold the carriage in its adjusted position.

The upper end of the guide rod —24— is provided with a hand piece —32— by which it, together with the screw —29—, may be rotated to adjust the carriage vertically.

The opposite guide rod —24'— is smooth and passed through apertures —33— and —34— in the lower and upper ends respectively of the carriage so as to permit the latter to slide freely thereon when adjusted by the rotation of the screw —29—.

This carriage supports a sectional frame upon which the lens holder is mounted and the object of its vertical adjustment is to permit the lens holder to be brought into grinding relation with the periphery of the grinder as the diameter of the latter is reduced by wear or rather, to permit the lens holder to be adjusted to grinders of different diameters, the object of elongating the gear-worm —22— being to maintain driving connection with the worm —27— in the various positions of adjustment of the carriage —25—, it being understood that the smooth portions of the guide rods —24— and —24'— and the screw —29— are of sufficient length to allow the lens holder to be adjusted to conform to the maximum and minimum radii of the grinder.

The supporting frame for the lens holder extends forwardly from the carriage —25— over the grind stone —14— so as to support the lens holder as nearly as possible directly over the axis of rotation of said grind stone and preferably consists of sections —35— and —36—, one of which, as —35—, is centrally supported by pivotal trunnions —37— on the lower and upper ends of the carriage —25— to swing in a horizontal plane about a vertical axis, said trunnions being adjustable to retain the frame section —35— firmly in place and are held in their adjusted positions by lock nuts —37'—, Figure 4.

The other section —36— is pivotally supported at its rear end by studs —38— on opposite sides of the front end of the section —35 to swing vertically about a horizontal axis.

The lens holder preferably consists of a pair of coaxial spindles —39— and —39'— journaled in suitable bearings —40— and —40'— on the front end of the vertically swinging frame —36— and have their adjacent ends provided with suitable means for clamping a lens as —a— between them, one of said spindles as —39'— being spring pressed toward the other by a coil spring —41— to yieldingly hold the lens between the heads during the process of grinding.

The lens holding spindles —39— and —39'— are actively disposed in a horizontal plane directly over the axis of the rotary grinder —14— but at an angle to said axis or rather diagonal to the plane of rotation of the grinder so as to hold the lens edgewise against both of the opposed grinding faces —14'— for simultaneously beveling both corners of the edge of the lens in a manner somewhat similar to that set forth in my Patent No. 1,527,594 previously referred to.

The outer end of the spindle —39— is provided with a spur gear —42— meshing with a relatively smaller spur gear —43— on the corresponding end of a spindle —44— which is journaled in the frame section —36— just back of and parallel with the spindles —39— and —39'— and to which rotary motion is transmitted from the spur gear —28— through the medium of a train of gears —45— and —45'—, Figure 3.

As illustrated, the gears —45'— are mounted respectively upon the shaft —44— and an additional shaft —44'— both of which are journaled in the frame section —36— between the frame section —35— and lens supporting spindles.

The other two gears —45— are mounted respectively upon suitable shafts —46— and —46'— which are journaled in suitable bearings on the frame section —35— at opposite sides of the pivotal studs —38— connecting the two frame sections —35— and —36—.

The supporting shafts for the gear train including the supporting shaft —26— for the worm-gear —27— and the pivotal studs —38— are parallel with the axis of the rotary lens holder and are, therefore, diagonally disposed relatively to the plane of rotation of the grinder.

The object in pivoting the rear end of the front frame section —36— to the frame section —35— at the rear of the front gear shaft —46— is to cause the gear —45'— on the shaft —44'— to break connection with the gear —45— on the shaft —46— when the frame section —36— is rocked upwardly to a substantially vertical position away from the grind stone in a manner hereinafter described, and thereby to stop the rotation of the lens holder while the remaining parts of the driving mechanism therefor continue to rotate.

A lens pattern —47— is secured to the outer end of the spindle —39— to rotate therewith against a suitable stop or pattern rest —48— which is mounted upon one end of a lever —49—, the latter being pivoted at —50— to the frame section —35— to swing vertically and having its rear end normally resting against the underside of the adjacent portion of the frame to hold the front end against undue downward displacement and permitting the rest —48— to be adjusted vertically by any suitable means similar to that set forth in my Patent No. 1,527,594 for determining the size of the finished lens.

The mounting of the pattern rest —48— upon the lever —49— in the manner described permits the front end of said lever with pattern rest thereon to be rocked upwardly by hand to contact with the pattern as the supporting section —36— for the lens holder is rocked downwardly toward the grindstone so that by supporting the front end of the lever in one hand, the operator may carefully lower the lens holder toward the stone and determine, by the sense of feeling, when the edge of the lens contacts with the stone to avoid any sudden impact between those parts which might injure the lens.

*Automatic feed for grindstone carriage.*

As previously stated, the lenses to be ground are cut to approximately the desired size and form so that it is only necessary to grind the edge of the lens to the required beveled finish and experience has proven that this may be accomplished by a predetermined number of revolutions of the lens against the stone according to the quality of the glass from which the lens is made and for this purpose, suitable means is provided for feeding the grinder supporting carriage a definite distance toward the lens holder for each revolution of said lens holder and also for stopping and automatically lifting the lens holder away from the grindstone at the end of a predetermined number of revolutions of the lens holder.

To this end, the lower end of the rear upright shaft —23— is provided with an eccentric bearing —51— adapted to engage one arm of a bell crank lever —52— which is pivoted at —53— to the underside of the cross bar —3'— to swing in a horizontal plane about a vertical axis and has its other end extended through an opening —54— in the adjacent side of the bracket —2— and pivotally connected to the rear end of a forwardly extending pawl —55—.

The lever —52— projects into the path of movement of the eccentric —51— at one side thereof, to be operated thereby against the action of a retracting spring —56— but is free to move away from said eccentric independently thereof, said spring being connected to the pawl —55— and also serves as a retracting means therefor.

The front end of the pawl extends beyond the front edge of the grinder and is adapted to engage the teeth of a ratchet wheel —57— which is secured to the outer end of a horizontal cross shaft —58—, the latter being journaled in suitable bearings in opposite sides of the carriage —8— at the front of the grindstone —14— and directly over the front end of the base —1—.

A spiral cam —59— is secured to the intermediate portion of the shaft —58— to ride against the periphery of a hardened bearing —60— which, in this instance, consists of a steel rod secured crosswise to and within the upper portion of the front end of the base —1— directly under the shaft —58— whereby the carriage —8— will be gradually raised a distance equal to the throw of the cam during each revolution thereof, from the shorter radius of contact with the bearing —60— to the longer radius.

A pawl-tripping plate —61— is mounted for angular adjustment on the hub —62— of the ratchet wheel —57— in close proximity to the outer face thereof so as to rock freely thereon and is provided with a laterally projecting peripheral flange or lip —63— extending across the teeth of the ratchet wheel to engage and trip the pawl at the end of each revolution of the cam —59— at about the same time the low point of the cam engages the bearing —60— so as to stop the further rotation of the shaft at the end of each revolution thereof, the circumferential length of the flange —63— being substantially equal to and slightly greater than the maximum distance of lengthwise travel of the pawl —55— to enable said pawl to slide back and forth thereon while the low point of the cam is registered with said bearing.

The plate or disk —61— is also provided with a slot —64— concentric with the axis of the shaft —58— for receiving a stud —65— on said ratchet wheel and allowing a limited angular adjustment of the plate by hand to shift the flange —63— forwardly from the pawl —55— and thereby permit the pawl to re-engage and rotate the ratchet wheel, said stud —65— being connected by a spring —66— to a laterally projecting shoulder —67— on the plate for automatically retracting the plate angularly when released.

The relation of the eccentric —51—, lever —52—, and teeth of the ratchet wheel —57— is such that when the maximum throw of the eccentric —51— is imparted to the lever —52—, it will move the pawl —55— endwise, a distance substantially equal to a certain number of, say three teeth of the ratchet wheel —57—, whereby the ratchet wheel will be adjusted angularly the circumferential distance of three teeth at each revolution of the shaft —23— thereby moving the grindstone carriage toward the axis of the lens holder a definite amount for each revolution of said lens holder by reason of the fact that the angular adjustment of the shaft —58— with the cam —59— thereon, as compared with the speed of rotation of the lens holder, is relatively slow.

That is, the driving connections between the shaft —23— and lens holder and between the same shaft and cam shaft —58— are adjusted to establish a definite minimum ratio of rotation between the lens holder and cam shaft of, say forty revolutions of the lens holder to one revolution of the cam shaft, which means that the grinder carriage —8— would be gradually moved toward the axis of the lens holder a predetermined distance corresponding to the maximum throw of the cam —59— during forty revolutions of the lens holder against the grinder sufficient to produce the desired beveled finish of the edge of the lens at which time, the flange —63— will have tripped the pawl —55— to stop the further rotation of the cam shaft with the low point of the cam resting on the bearing —60—.

Suitable means is provided for varying this speed ratio of the lens holder and cam shaft by varying the amount of lengthwise movement of the pawl —55— and for this purpose, is provided a relatively short vertical shaft —68— journaled in suitable bearings —69— on one side of the grinder carriage —8— and provided with a hand piece —70— by which it may be rotated.

The upper end of the shaft —68— is provided with an eccentric pin —71— extending into a longitudinally elongated slot —72— of sufficient length to allow the maximum forward movement of said pawl against the action of the retracting spring —56—, so that when the eccentric —51— on the lower end of the shaft —23— is at its maximum distance away from the adjacent end of the lever —52—, the pin —71— will be engaged with the front wall of the slot 72.

Figure 1:
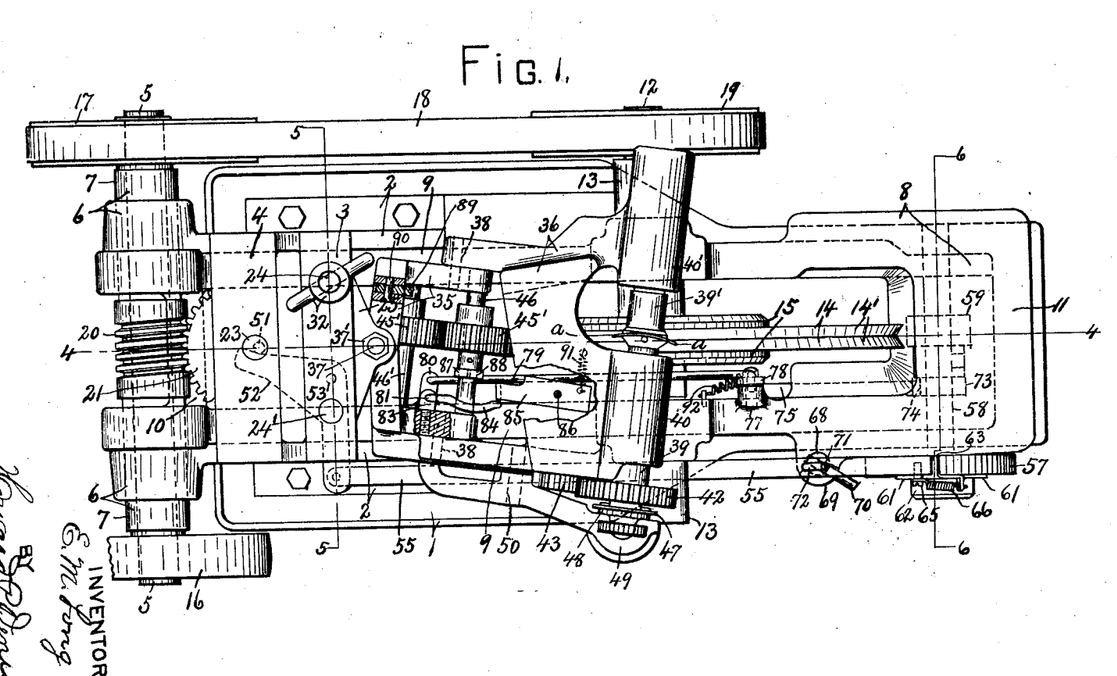
Figure 1 is a top plan, partly in section, of a lens edging machine embodying the various features of my invention.
Figure 2:
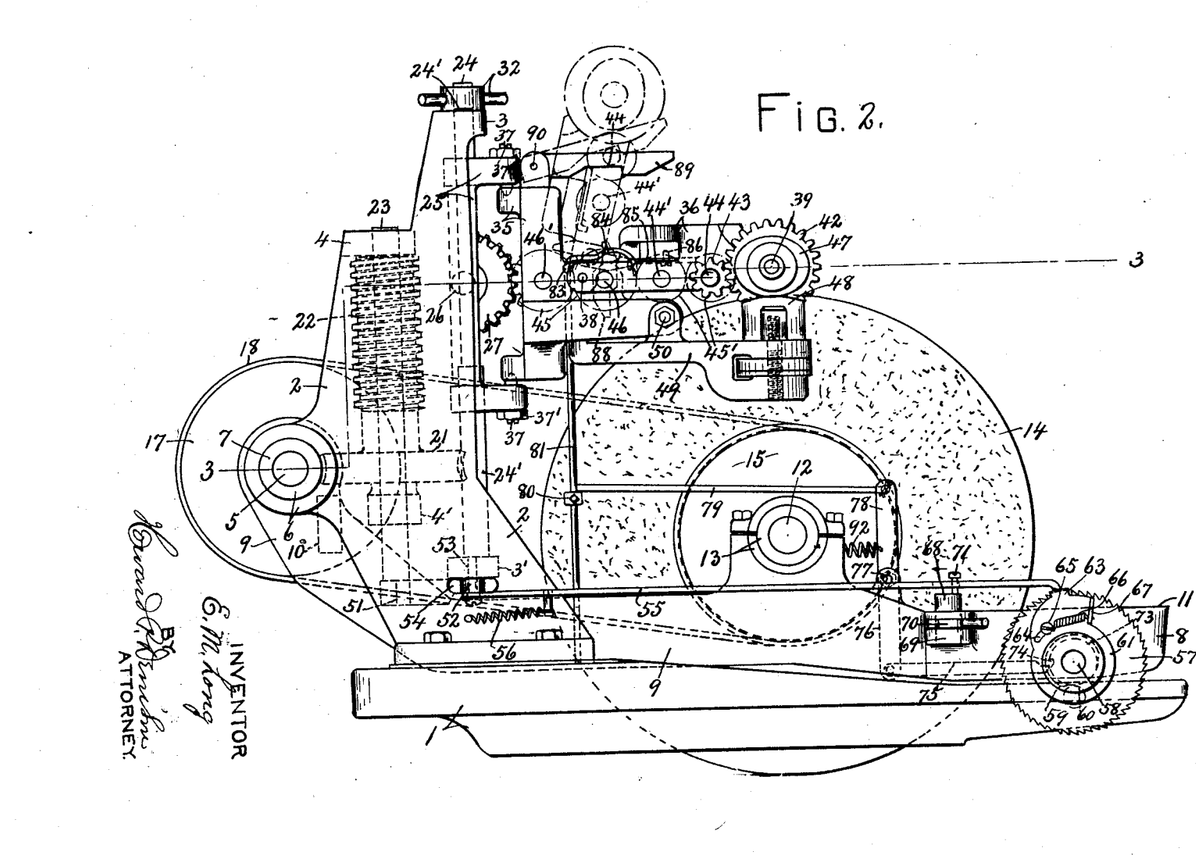
Figure 2 is a side elevation of the same machine in which the lens supporting carriage is shown by dotted lines as swung upwardly away from the grind stone.

It is now evident that rocking the hand piece —70— rearwardly from the position shown in Figures 1 and 2, will cause a similar angular adjustment of the eccentric —71— which will allow the spring —56— to retract the pawl —55— and its operating lever —52— for the purpose of moving the pawl a greater distance and imparting a correspondingly greater angular movement to the rachet wheel —57— and cam —59— whereby the grinder carriage will be moved toward the grinder a greater distance at each revolution of the lens holder resulting in the beveled finishing of the lens with a less number of turns of the lens holder during one complete revolution of the cam shaft —58—, the adjustment of the throw or the movement of the pawl being determined by the quality of the lens or by the number of revolutions of said lens against the grinder to produce the desired beveled finish.

Lens holder lifting mechanism.

Secured to the cam shaft —58— is a circular disk —73— having a peripheral notch —74— adapted to receive the front end of a rearwardly extending reciprocatory bar —75— which is guided in suitable ways on the cariage —8— radial to the shaft —58— and has its rear end pivotally connected to a crank arm —76— of a rock shaft —77—.

This rock shaft —77— is journaled in suitable bearings upon the adjacent side of the grinder carriage —8— and is provided with an upwardly extending crank arm —78— which is pivotally connected to the front end of a rearwardly extending link —79— having its rear end connected to a crank arm —80— on an upright rock shaft —81— at the rear of the axis of the grindstone shaft —12—.

The shaft —81— has its lower end stationed in a bearing —82— and its upper end journaled in a bearing —83— on the carriage —35— relatively close to its axis of movement on the trunnions —37—.

The extreme upper end of the rock shaft —81— is provided with a crank arm —84— which projects forwardly some distance beyond the shaft —46— for side thrust engagement with the rear end of a lifting pawl —85—, the latter being pivoted at —86— to the under side of an overlying portion of the frame section —36— to swing in a horizontal plane.

A lifting cam —87— is secured to the shaft —46— to rotate therewith and is provided with oppositely extending arms —88— adapted to engage the under side of the pawl —85— when the latter is shifted laterally into the path thereof for rocking the frame section —36— and lens holder carried thereby, upwardly about the axis of the pivotal studs —38— to approximately a vertical position for interlocking engagement with a latch —89— which is pivoted at —90— to the upper end of the frame section —35— as shown in Figure 2.

A retracting spring —91—, Figure 1, is operatively connected to the front end of the pawl —85— for normally holding the rear end of said pawl out of the path of movement of the cam members —87— while the crank arm —78— and parts actuated thereby including the link —79— and rock shaft —81— together with its offset upper end —84—, are operated to release the pawl —85— by means of a retracting spring —92— which also exerts a forward endwise pressure upon the pawl —75— to hold it in engagement with the periphery of the notched disk —73— as the shaft —58— is rotated by the pawl —55— and ratchet wheel —57— and to force the forward end of the pawl —75— into the notch —74— of said disk when registered with the pawl.

That is, the high point of the cam —59— and notch —74— have a definite circumferential or angular relation to each other whereby the notch —74— will be brought into registration with the adjacent end of the pawl —75— to cause the lifting of the lens holding section —36— away from the grindstone at about the same time that the high point of the cam —59— registers with the bearing —60— or at the end of each revolution of the shaft —58— at which time, the frame section —36— will be rocked upwardly to the position shown by dotted lines in Figure 2, thereby breaking connection between the gears on the shaft —44'— and —46— and consequently stopping the rotation of the lens holder.

The disk —61— is adjusted to bring its tripping member —63— for the pawl —55— into a definite circumferential relation or angle to the high point of the cam —59— so as to trip said pawl out of engagement with the ratchet wheel —57— at the end of each revolution of the shaft —58— or when the low point of the cam —59— is registered with the bearing —60— thereby stopping the further rotation of the ratchet wheel —57— and allowing the front end of the pawl to simply ride back and forth upon the lateral offset —63— without performing any work.

It is now evident that when the low point of the cam —59— is registered with the bearing —60—, the lens holder will be at rest in an elevated position while the shaft —58— and parts carried thereby will also be at rest.

This lifting and latching of the lens holder away from the grinder as the high point of the cam —59— rides against the bearing —60— is comparatively quick owing to the use of two lifting pawls —87— and the relatively higher speed of rotation of the shaft —46— as compared with that of the cam shaft —58— and then as the point of contact of the cam —59— with the bearing —60— shifts from the high point to the low point, the pawl —75— will be forced endwise out of the notch —74— by engagement with the periphery of said disk —73— and will thereby allow the pawl —85— to be withdrawn out of the path of movement of the cam —87— by its spring and permit the lens holder to be restored to its grinding position —91— and at the same time, the tripping member —63— will have been moved forwardly to trip the pawl —55— and to hold it in its tripped position until the disk —61— is advanced by hand to permit re-engagement of said pawl with the teeth of the ratchet wheel.

As soon as the support —36— for the lens holder is lowered to its grinding position, the disk —61— is advanced or adjusted forwardly by hand against the action of the spring —66— to permit the pawl to re-engage and rotate the ratchet wheel to cause a repetition of the cycle of operation, the disk —61— being released and returned against the stop pin —65— at the beginning of each cycle.

The stroke of the pawl —55— may be varied by adjusting the position of the eccentric pin —71— through the medium of the hand piece —70— which limits the rearward stroke of said pawl by engagement of the pin —71— with the front wall of the slot —72—, it being understood that the pawl —55— is yieldingly held against the stop —71— by the spring —56— and that when the pawl is held by the stop —71— against its maximum rearward movement, the rear arm of the lever —52— will be similarly held against its extreme inward movement toward its operating pin —51— on the shaft —23— whereby the arc of movement of the lever —52— will depend upon its proximity to the eccentric pin —51— when the latter is at its point of revolution most remote from said lever.

By this adjustment, the pawl —55— may be caused to operate the ratchet wheel —57— one-tooth space, two-teeth space or three-teeth space according to the amount of vertical adjustment of the grindstone carriage —8— which may be necessary for each revolution of the lens holder to complete the grinding operation by a predetermined number of revolutions of said lens holder; at each complete revolution of the cam —59— whereupon the lens supporting frame section —36— will be again elevated and the gear connections with the lens holder broken and at the same time, the tripping member —63— will be moved under the front end of the pawl —55— to stop the lifting operation of the cam —59— upon the grindstone supporting carriage —8— ready for a repetition of the operations previously described.

I claim:

1. In a lens edging machine, a rotary grinder having opposed co-axial grinding faces, means for rotating the grinder, a rotary lens holder in grinding relation to the grinder, means for rotating the lens holder, means for moving the grinder toward the lens holder a pre-determined distance for each revolution of the lens holder, and means for automatically moving the lens holder away from the grinder at the end of a predetermined number of revolutions of said lens holder.

2. In a lens edging machine, a rotary grinder having opposed co-axial grinding faces, means for rotating the grinder, a rotary lens holder in grinding relation to the grinder, means for rotating the lens holder, means for moving the grinder toward the lens holder a pre-determined distance for each revolution of the lens holder and means for lifting the lens holder away from the grinder when the grinder is moved a certain distance toward the lens holder.

3. In a lens edging machine, a rotary grinder having opposed co-axial grinding faces, means for rotating the grinder, a rotary lens holder in grinding relation to the grinder, means for rotating the lens holder, means for moving the grinder toward the lens holder a predetermined distance for each revolution of the lens holder, and means for supporting the lens holder so that it may automatically shift axially by contact of the lens with the grinder.

4. In a lens edging machine, a rotary lens holder, a support for the lens holder, a rotary grinder, a support for the grinder hinged to swing about an axis parallel with that of the grinder to move said grinder toward and from the lens holder, and means for rocking said grinder support about its axis toward the lens holder a definite amount for each revolution of said lens holder.

5. In a lens edging machine, a grinder support hinged at one end to swing about a horizontal axis, a rotary grinder journaled on the support intermediate its ends, a rotary lens holder in grinding relation to the grinder, a rotary cam engaging the other end of the grinder support for rocking the same to feed the grinder toward the lens holder, means for rotating the lens holder, and means for rotating the cam a definite amount for each revolution of the lens holder.

6. In a lens edging machine, a rotary lens holder, a movable support therefor, means for rotating the lens holder, a rotary grinder, a support for the grinder movable toward the lens holder, a rotary cam for feeding the grinder support toward the lens holder, means for rotating the cam a definite amount for each revolution of the lens holder, and means for rotating the grinder.

7. In a lens edging machine, a frame, a rotary shaft mounted on the frame, means for rotating the shaft, a carriage hinged to swing about the axis of the shaft, a rotary grinder mounted on the carriage, a rotary lens holder, a support for the lens holder movable toward and from the grinder, a cam for rocking the carriage to move the grinder toward the lens support, means for transmitting rotary motion from the shaft to the grinder, additional means for transmitting rotary motion from the shaft to the lens holder, and means for transmitting rotary motion from the shaft to the cam.

8. In a bevel-edge lens grinding machine a rotary grinder having opposed peripheral grinding faces, a support for the grinder movable about a horizontal axis some distance from and parallel with the axis of the grinder, a rotary lens holder extending diagonally across the upper face of the grinder with the lens in contact with both of the grinding faces at one and the same side of its axis of rotation, and means synchronized with the rotation of the lens holder for raising the supporting frame for the grinding element toward the lens holder as the lens is ground away.

9. In a bevel-edge lens grinding machine a rotary grinder having opposed peripheral grinding faces, a support for the grinder movable about a horizontal axis some distance from and parallel with the axis of the grinder, a rotary lens holder extending diagonally across the upper face of the grinder with the lens in contact with both of the grinding faces at one and the same side of its axis of rotation, means synchronized with the rotation of the lens holder for raising the supporting frame for the grinding element toward the lens holder as the lens is ground away, and a supporting frame for the lens holder movable about a vertical axis between the axis of the grinding element and the axis of movement of the supporting frame for said grinding element.

10. In a lens edging machine, a rotary grinder, means for rotating the grinder, a rotary lens holder, means actuated by a part of the grinder-rotating means for rotating the lens holder, additional means including a rotary cam actuated by a part of the grinder-rotating means for moving the grinder toward the lens-holder a definite amount for each rotation of said lens holder, and means for stopping the rotation of the cam at the end of each revolution thereof.

11. In a lens edging machine, a rotary grinder, means for rotating the grinder, a rotary lens holder, means actuated by a part of the grinder-rotating means for rotating the lens holder, additional means including a rotary cam actuated by a part of the grinder-rotating means for moving the grinder toward the lens-holder a definite amount for each rotation of said lens holder, and means for lifting the lens holder away from the grinder at the end of each revolution of the cam.

12. In a bevel-edge lens grinding machine, a rotary grinder having opposed peripheral grinding faces, a supporting frame for the grinding element movable about a horizontal axis some distance from and parallel with the axis of rotation of the grinding element, a rotary lens holding element and a supporting frame therefor movable about a vertical axis in substantially the plane of rotation of the grinding element.

13. In a bevel-edge lens grinding machine, a rotary grinder having opposed peripheral grinding faces, a supporting frame for the grinding element movable about a horizontal axis some distance from and parallel with the axis of rotation of the grinding element, a rotary lens holding element and a supporting frame therefor movable about a vertical axis in substantially the plane of rotation of the grinding element, and means synchronized with the rotation of the lens holder for moving the supporting frame for the grinding element toward the lens holder as the lens is ground away.

14. In a lens edging machine, a frame having a bearing near one end, a grinder supporting carriage hinged to the opposite end of the frame to swing toward and from said bearing, a rotary cam journaled on the carriage to ride against said bearing for moving the frame away from the bearing, a rotary grinder journaled on the carriage, means for rotating the grinder, a rotary lens holder, a support for the lens holder movable by contact of the lens with the grinder as the latter is moved with the carriage, means actuated by a part of the first named means for rotating the lens holder, and means actuated by a part of the first named means for rotating the cam.

15. A lens edging machine as in claim 14 in which means is provided for stopping the rotation of the cam at the end of each revolution thereof.

16. A lens edging machine as in claim 14 in which means is provided for lifting the lens holder away from the grinder at the end of each revolution of the cam.

In witness whereof I have hereunto set my hand this 19th day of March 1923.

ELI MAYNARD LONG.

CERTIFICATE OF CORRECTION.

Patent No. 1,657,720.                  Granted January 31, 1928, to

ELI MAYNARD LONG.

It is hereby certified that the above numbered patent was erroneously issued to "The Standard Optical Company, of Geneva, N. Y., a Corporation of New York", whereas said Letters Patent should have been issued to "Shur-On Standard Optical Company, Inc., of Geneva, N. Y., a Corporation of New York, said Corporation being assignee of the entire interest in said invention", as shown by the records of assignments in this office; and that the said Letters Patent should be read with this correction therein that the same may conform to the record of the case in the Patent Office.

Signed and sealed this 13th day of March, A. D. 1928.

Seal.                                                                  M. J. Moore,
                                                                      Acting Commissioner of Patents.